US010447867B2

(12) United States Patent
Liu et al.

(10) Patent No.: US 10,447,867 B2
(45) Date of Patent: Oct. 15, 2019

(54) TWO-SIDED SCANNING DEVICE HAVING BRIGHTNESS CALIBRATION COMPONENTS AND SCANNING BACKGROUND COMPONENTS AND OFFICE MACHINE THEREWITH

(71) Applicant: AVISION INC., Hsinchu (TW)

(72) Inventors: Te-Hsun Liu, Hsinchu (TW); Chi-Yao Chen, Miaoli County (TW); Chin-Jung Tu, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 15/963,059

(22) Filed: Apr. 25, 2018

(65) Prior Publication Data

US 2019/0007576 A1 Jan. 3, 2019

(30) Foreign Application Priority Data

Jun. 29, 2017 (TW) ............................ 106209489 U

(51) Int. Cl.
*H04N 1/04* (2006.01)
*H04N 1/00* (2006.01)
*H04N 1/203* (2006.01)

(52) U.S. Cl.
CPC ..... *H04N 1/00018* (2013.01); *H04N 1/00087* (2013.01); *H04N 1/00708* (2013.01);
(Continued)

(58) Field of Classification Search
None
See application file for complete search history.

(56) References Cited

U.S. PATENT DOCUMENTS 7,064,874 B2 * 6/2006 Imai ..................... H04N 1/2032 358/447
7,391,540 B2 * 6/2008 Chen .................. H04N 1/00737 358/461
7,646,514 B2 * 1/2010 Spears .................. H04N 1/203 358/474

(Continued)

FOREIGN PATENT DOCUMENTS

CN 1705338 A 12/2005
CN 102123228 A 7/2011

(Continued)

*Primary Examiner* — Scott A Rogers
(74) *Attorney, Agent, or Firm* — Winston Hsu

(57) ABSTRACT

A two-sided scanning device includes a first image scanning module, a second image scanning module, a first scanning background component, a first brightness calibration component, a second scanning background component, and a second brightness calibration component. When the second image scanning module moves relative to the first image scanning module to a scanning position, the second image scanning module drives the first scanning background component to move relative to the first image scanning module, so that the first image scanning module and the second image scanning module are aligned with the first scanning background component and the second scanning background component, respectively. Therefore, the first scanning background component and the second scanning background component can be scanning backgrounds for the first image scanning module and the second image scanning module to generate a scanning image of an object with a size corresponding to an actual size of the object.

20 Claims, 11 Drawing Sheets

(52) U.S. Cl.
CPC ..... *H04N 1/00737* (2013.01); *H04N 1/00819* (2013.01); *H04N 1/04* (2013.01); *H04N 1/2032* (2013.01); *H04N 2201/044* (2013.01); *H04N 2201/0448* (2013.01)

(56) References Cited

U.S. PATENT DOCUMENTS 8,395,827 B2 * 3/2013 Sheng .................... H04N 1/121 271/264
8,659,808 B2 2/2014 Huang
8,749,860 B2 * 6/2014 Arima .................... H04N 1/401 358/1.1
8,928,952 B2 * 1/2015 Tu ...................... H04N 1/00018 358/408
9,674,389 B2 * 6/2017 Kanaya .............. H04N 1/00716
10,021,268 B1 * 7/2018 Ito .......................... H04N 1/401
2001/0030774 A1 * 10/2001 Bromley ............ H04N 1/40056 358/474
2009/0195840 A1 * 8/2009 Oishi ..................... H04N 1/401 358/461
2013/0278978 A1 * 10/2013 Sung .................... H04N 1/6027 358/505
2018/0359385 A1 * 12/2018 Sheng ................ H04N 1/00755

FOREIGN PATENT DOCUMENTS

CN 203225821 U 10/2013
CN 203968210 U 11/2014
CN 105100541 A 11/2015
CN 207442981 U 6/2018

* cited by examiner

TWO-SIDED SCANNING DEVICE HAVING BRIGHTNESS CALIBRATION COMPONENTS AND SCANNING BACKGROUND COMPONENTS AND OFFICE MACHINE THEREWITH

BACKGROUND OF THE DISCLOSURE

1. Field of the Disclosure

The present disclosure relates to a two-sided scanning device and an office machine therewith, and more particularly, to a two-sided scanning device having brightness calibration components and scanning background components and an office machine therewith.

2. Description of the Prior Art

With advance of the technology, office machines, such as scanners or printers, are widely used in people's daily lives for improving working efficiencies. Generally, an office machine having a two-sided scanning function includes an auto document feeder (ADF) and a two-sided scanning device. When it is desired to scan two opposite sides of an object at a time, the auto document feeder can drive the object, such as a sheet of paper, to pass through the two-sided scanning device, so as to scan the two opposite sides of the object. The two-sided scanning device uses white boards not only for calibrating scanning brightness of image scanning modules but also as scanning backgrounds for the image scanning modules. However, an edge of the object is usually white. Therefore, it is difficult to distinguish between a scanned image of the object and a scanned image of the scanning background, which causes a recognized size of the scanned image of the object to be different from an actual size of the scanned image of the object.

SUMMARY OF THE DISCLOSURE

Therefore, it is an objective of the present disclosure to provide a two-sided scanning device having brightness calibration components and scanning background components and an office machine therewith for solving the aforementioned problems.

In order to achieve the aforementioned objective, the present disclosure discloses a two-sided scanning device. The two-sided scanning device includes a first image scanning module, a second image scanning module, a first scanning background component, a first brightness calibration component, a second scanning background component and a second brightness calibration component. The first image scanning module is for scanning a first side of an object. The second image scanning module is disposed opposite to the first image scanning module and for scanning a second side of the object opposite to the first side of the object. The first scanning background component is used as a first scanning background for the first image scanning module. The first brightness calibration component is for calibrating a scanning brightness of the first image scanning module. The second scanning background component is used as a second scanning background for the first image scanning module. The second brightness calibration component is for calibrating a scanning brightness of the second image scanning module. The second image scanning module moves relative to the first image scanning module to align the second image scanning module with the second brightness calibration component or the second scanning background component selectively and further to align the first image scanning module with the first brightness calibration component or the first scanning background component selectively, and the first image scanning module and the second image scanning module are aligned with the first scanning background component and the second scanning background component respectively when the second image scanning module moves to a scanning position relative to the first image scanning module.

In order to achieve the aforementioned objective, the present disclosure discloses an office machine. The office machine includes a scanning passage, a feeder and a two-sided scanning device. The scanning passage is for allowing an object to pass therethrough. The feeder is for driving the object to pass through the scanning passage. The two-sided scanning device is for scanning a first side and a second side of the object entering into the scanning passage. The first side is opposite to the second side, and the two-sided scanning device includes a first image scanning module, a second image scanning module, a first scanning background component, a first brightness calibration component, a second scanning background component and a second brightness calibration component. The first image scanning module is for scanning the first side of the object. The second image scanning module is disposed opposite to the first image scanning module and for scanning the second side of the object. The first scanning background component is used as a first scanning background for the first image scanning module. The first brightness calibration component is for calibrating a scanning brightness of the first image scanning module. The second scanning background component is used as a second scanning background for the first image scanning module. The second brightness calibration component is for calibrating a scanning brightness of the second image scanning module. The second image scanning module moves relative to the first image scanning module to align the second image scanning module with the second brightness calibration component or the second scanning background component selectively and further to align the first image scanning module with the first brightness calibration component or the first scanning background component selectively, and the first image scanning module and the second image scanning module are aligned with the first scanning background component and the second scanning background component respectively when the second image scanning module moves to a scanning position relative to the first image scanning module.

In summary, the present disclosure utilizes the second image scanning module for selectively driving the first brightness calibration component or the first scanning background component to be aligned with the first image scanning module when the second image scanning module moves relative to the first image scanning module. In such a way, the first image scanning module and the second image scanning module are aligned with the first brightness calibration component and the second brightness calibration component respectively when it is desired to calibrate the scanning brightness of the first image scanning module and the scanning brightness of the second image scanning module. Besides, the first image scanning module and the second image scanning module are aligned with the first scanning background component and the second scanning background component respectively when it is desired to scan the first side and the second side of the object opposite to each other, so that the first scanning background component and the second scanning background component can be used as the first scanning background for the first image scanning module and the second scanning background for the second image scanning module respectively. Therefore, it facilitates the two-sided scanning device of the present disclosure to distinguish between scanned images of the object and scanned images of the scanning backgrounds, which makes a recognized size of the scanned images of the object match with an actual size of the scanned images of the object.

These and other objectives of the present disclosure will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. Accordingly, the drawings and descriptions will be regarded as illustrative in nature and not as restrictive.

Figure 1:
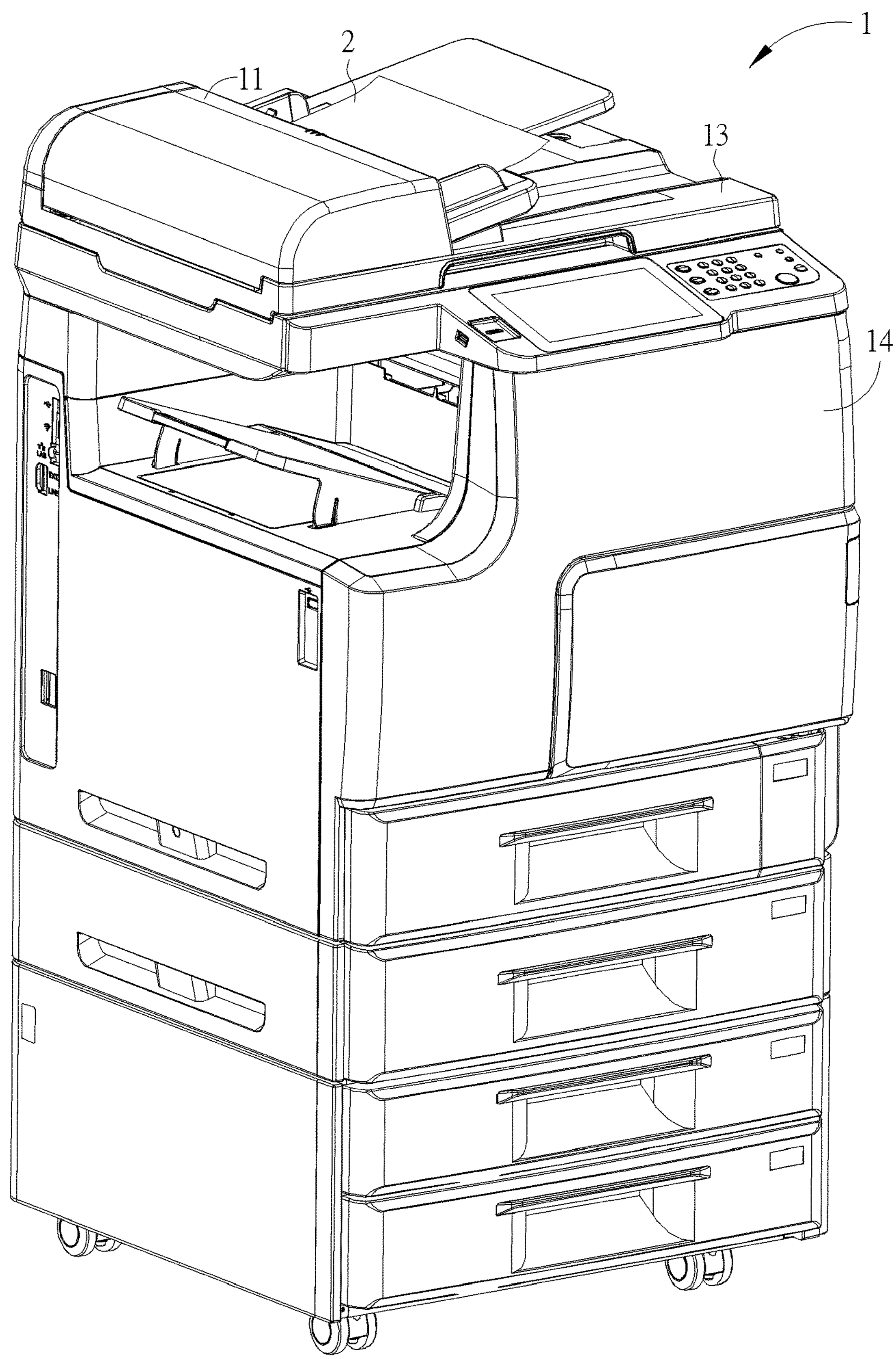
FIG. 1 and FIG. 2 are schematic diagrams of an office machine in different states according to a first embodiment of the present disclosure.
Figure 2:
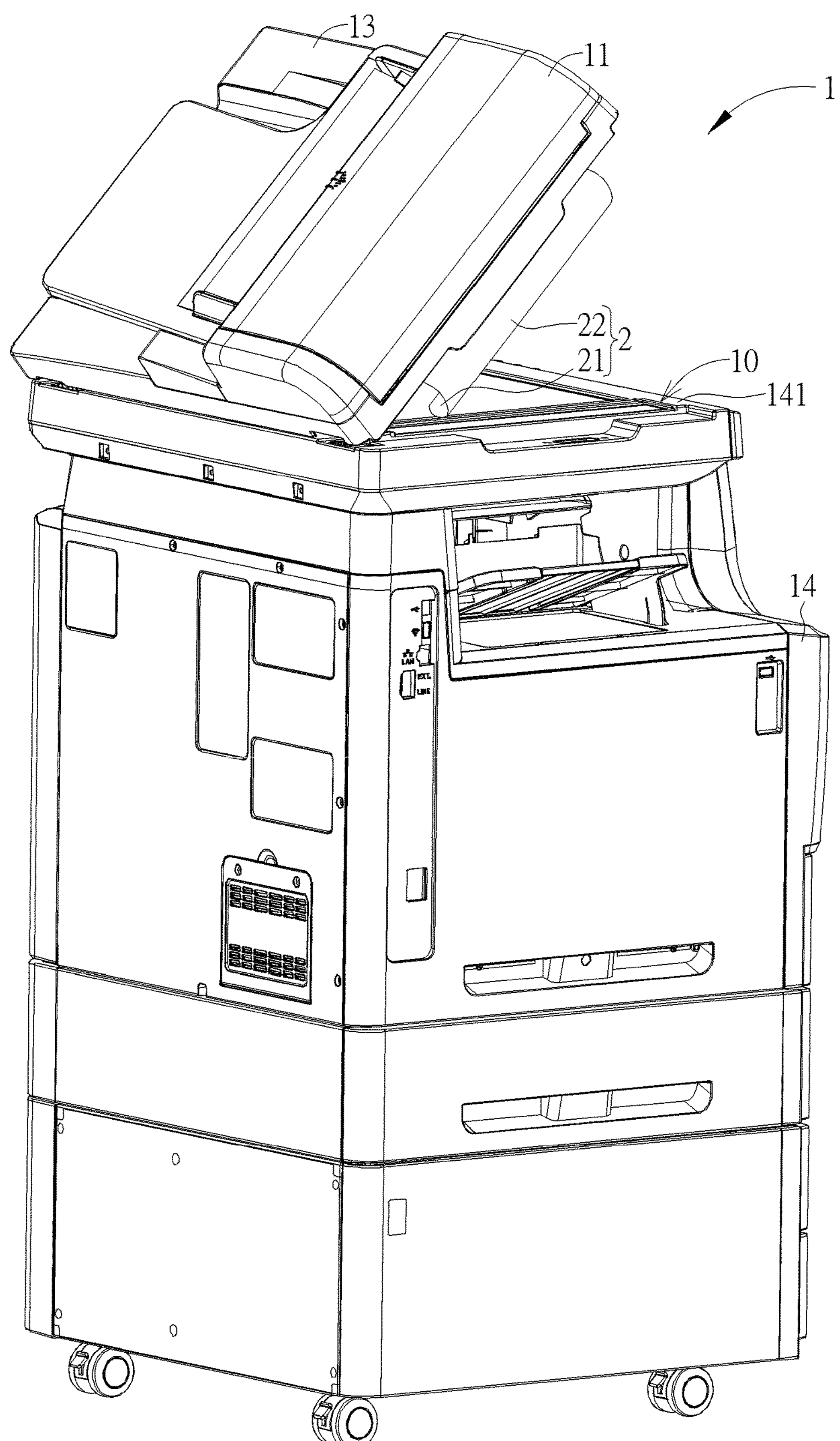
Figure 3:
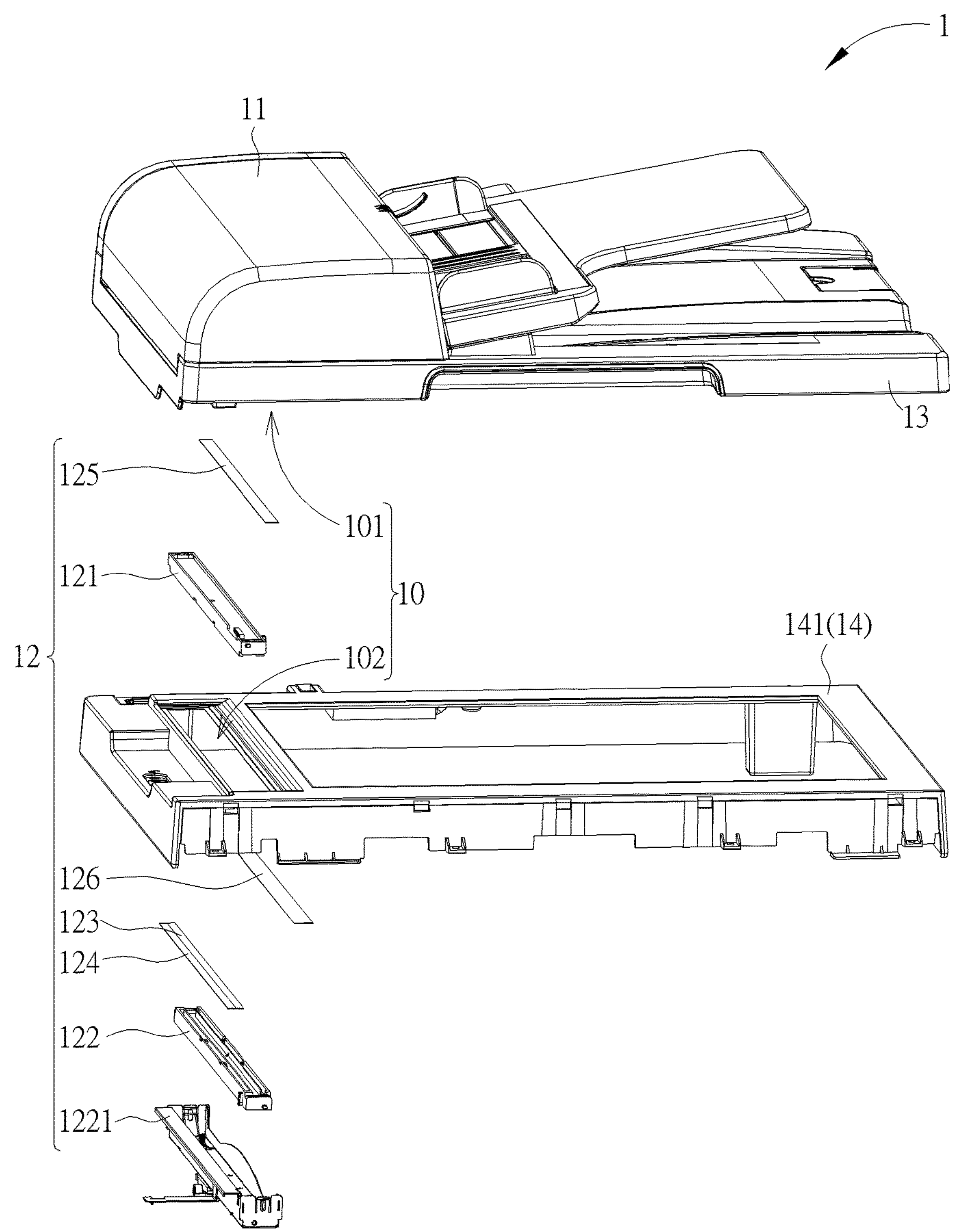
FIG. 3 and FIG. 4 are partial exploded diagrams of the office machine at different views according to the first embodiment of the present disclosure.
Figure 4:
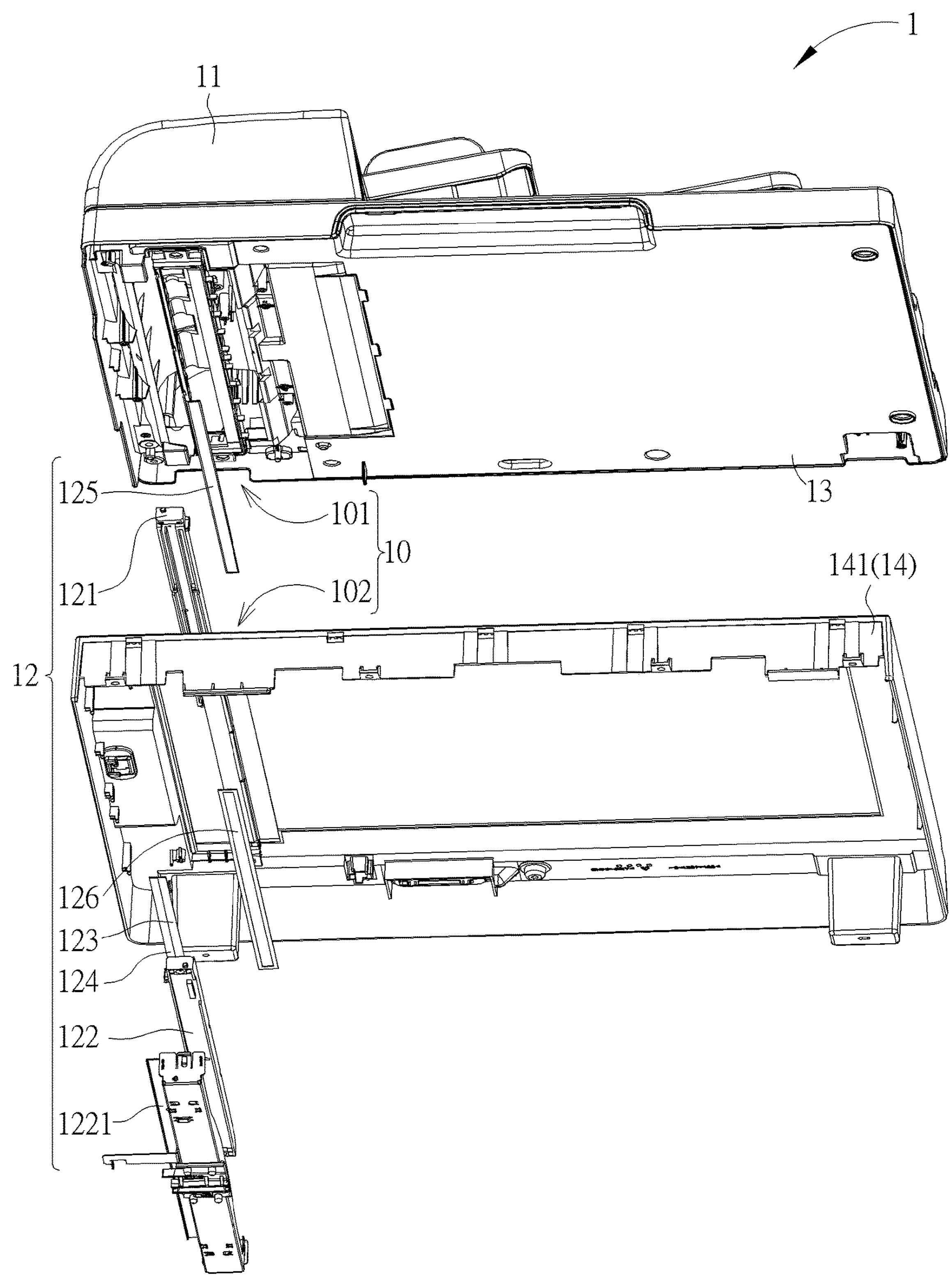

Please refer to FIG. 1 to FIG. 4. FIG. 1 and FIG. 2 are schematic diagrams of an office machine 1 in different states according to a first embodiment of the present disclosure. FIG. 3 and FIG. 4 are partial exploded diagrams of the office machine 1 at different views according to the first embodiment of the present disclosure. As shown in FIG. 1 to FIG. 4, in this embodiment, the office machine 1 can be a multi-function peripheral having functions of printing, faxing, copying and scanning. The office machine 1 includes a scanning passage 10, a feeder 11, a two-sided scanning device 12, an upper casing 13 and a main body 14. The upper casing 13 is pivoted to the main body 14 and can be open and closed relative to the main body 14. The main body 14 includes a scanning platform 141. The scanning passage 10 is formed between the upper casing 13 and the scanning platform 141 for allowing an object 2 to pass therethrough. The feeder 11 is disposed on the upper casing 13 and for driving the object 2 to pass through the scanning passage 10. The two-sided scanning device 12 is disposed on two opposite sides of the scanning passage 10 and for scanning a first side 21 of the object 2 and a second side 22 of the object 2 opposite to the first side 21 of the object 2 when the object 2 enters the scanning passage 10. In this embodiment, the object 2 can be a sheet of paper, and the feeder 11 can be an auto document feeder. However, it is not limited to this embodiment.

As shown in FIG. 3 and FIG. 4, the two-sided scanning device 12 includes a first image scanning module 121, a second image scanning module 122, a first scanning background component 123, a first brightness calibration component 124, a second scanning background component 125 and a second brightness calibration component 126. The first image scanning module 121 is disposed on the upper casing 13. The second image scanning module 122 is movably disposed on the main body 14 and opposite to the first image scanning module 121. In other words, the first image scanning module 121 and the second image scanning module 122 are respectively located at a first scanning side 101 of the scanning passage 10 and a second scanning side 102 of the scanning passage 10 opposite to the first scanning side 101 of the scanning passage 10 for scanning the first side 21 and the second side 22 of the object 2. The second image scanning module 122 includes a disposing platform 1221. The first scanning background component 123 and the first brightness calibration component 124 are disposed on the disposing platform 1221 of the second image scanning module 122 and adjacent to each other, so that the first scanning background component 123 and the first brightness calibration component 124 are movable relative to the first image scanning module 121 along with the second image scanning module 122 as the second image scanning module 122 moves relative to the first image scanning module 121. In other words, the first scanning background component 123 and the first brightness calibration component 124 are located at the second scanning side 102 of the scanning passage 10. The first scanning background component 123 is used as a first scanning background for the first image scanning module 121. The first brightness calibration component 124 is a basis of calibrating a scanning brightness of the first image scanning module 121. In this embodiment, the first scanning background component 123 and the first brightness calibration component 124 can be connected to each other. However, it is not limited thereto. For example, the first brightness calibration component 124 also can be separated from each other. It depends on practical demands.

Furthermore, the second scanning background component 125 is located at the first scanning side 101 of the scanning passage 10 and adjacent to the first image scanning module 121. The second brightness calibration component 126 is located at the second scanning side 102 of the scanning passage 10 and disposed between the scanning platform 141 and the second image scanning module 122. The second scanning background component 125 is used as a second scanning background for the second image scanning module 122. The second brightness calibration component 126 is a basis of calibrating a scanning brightness of the second image scanning module 122. However, the structures and the configurations of the first scanning background component 123, the first brightness calibration component 124, the second scanning background component 125 and the second brightness calibration component 126 are not limited to those illustrated in the figures of this embodiment. For example, in another embodiment, the second brightness calibration component 126 also can be disposed on the first scanning side 101 of the scanning passage 10. A transparent area is formed on the scanning platform 141 and located at a position corresponding to the second brightness calibration component 126, so that the second image scanning module

122 can scan the second brightness calibration component 126 through the transparent area for calibrating the scanning brightness of the second image scanning module 122. In other words, structure or configuration which allows the first scanning background component 123 and the second scanning background component 125 to be used as the first scanning background for the first image scanning module 121 and the second scanning background for the second image scanning module 122 respectively and allows the first brightness calibration component 124 and the second brightness calibration component 126 as bases to calibrate the first image scanning module 121 and the second image scanning module 122 is included within the scope of the present disclosure.

Figure 5:
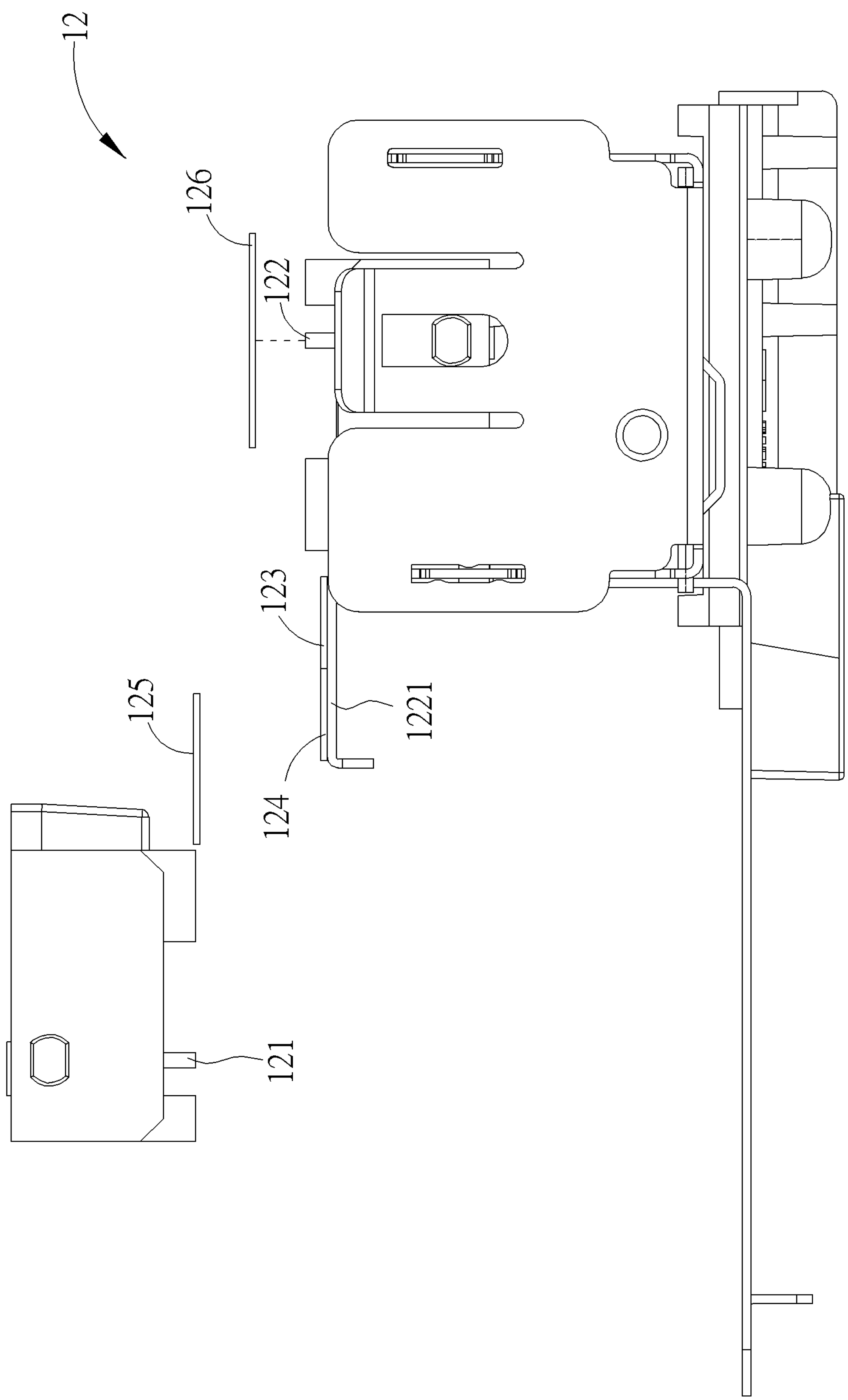
FIG. 5 to FIG. 7 are diagrams of a two-sided scanning device in different states according to the first embodiment of the present disclosure.
Figure 6:
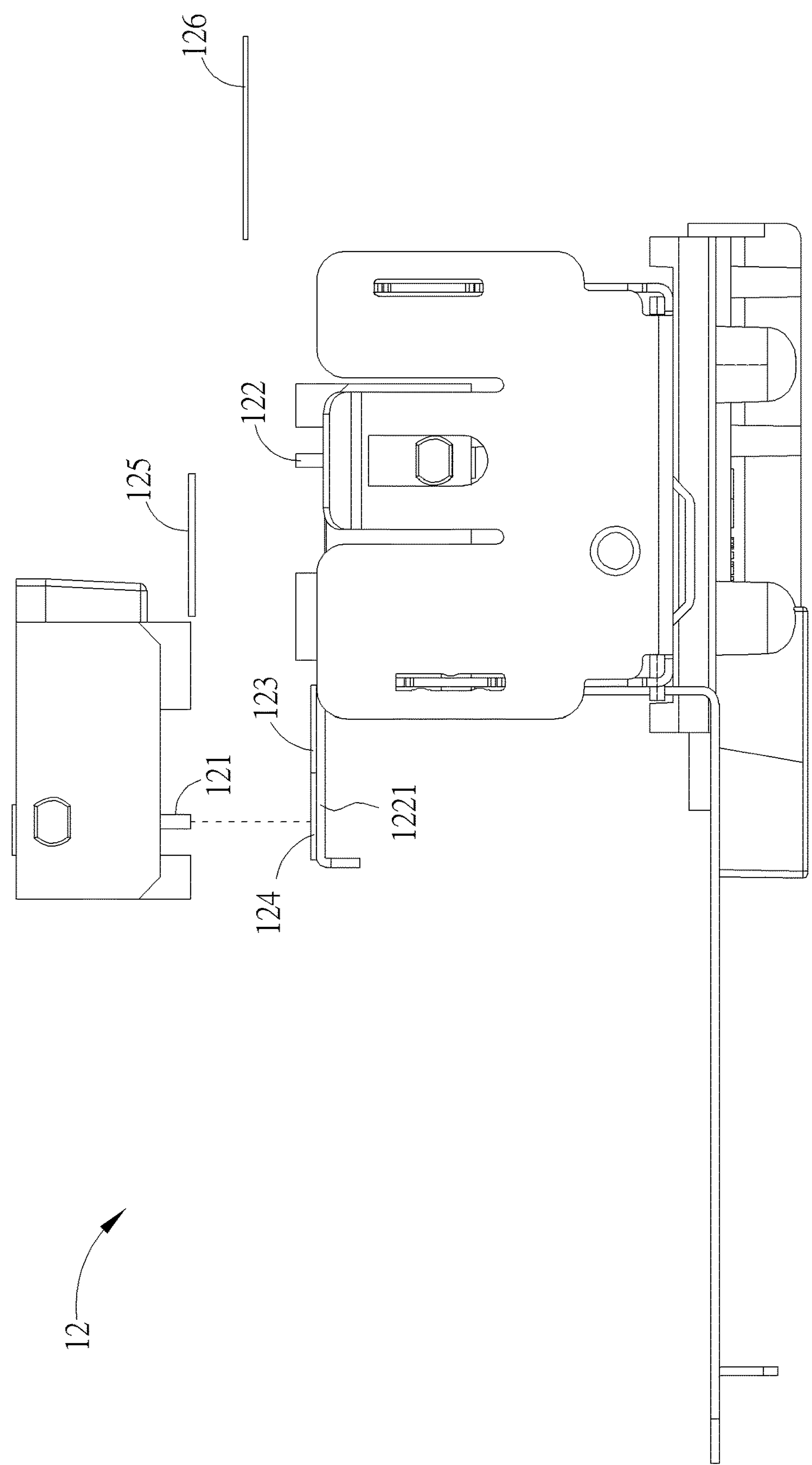
Figure 7:
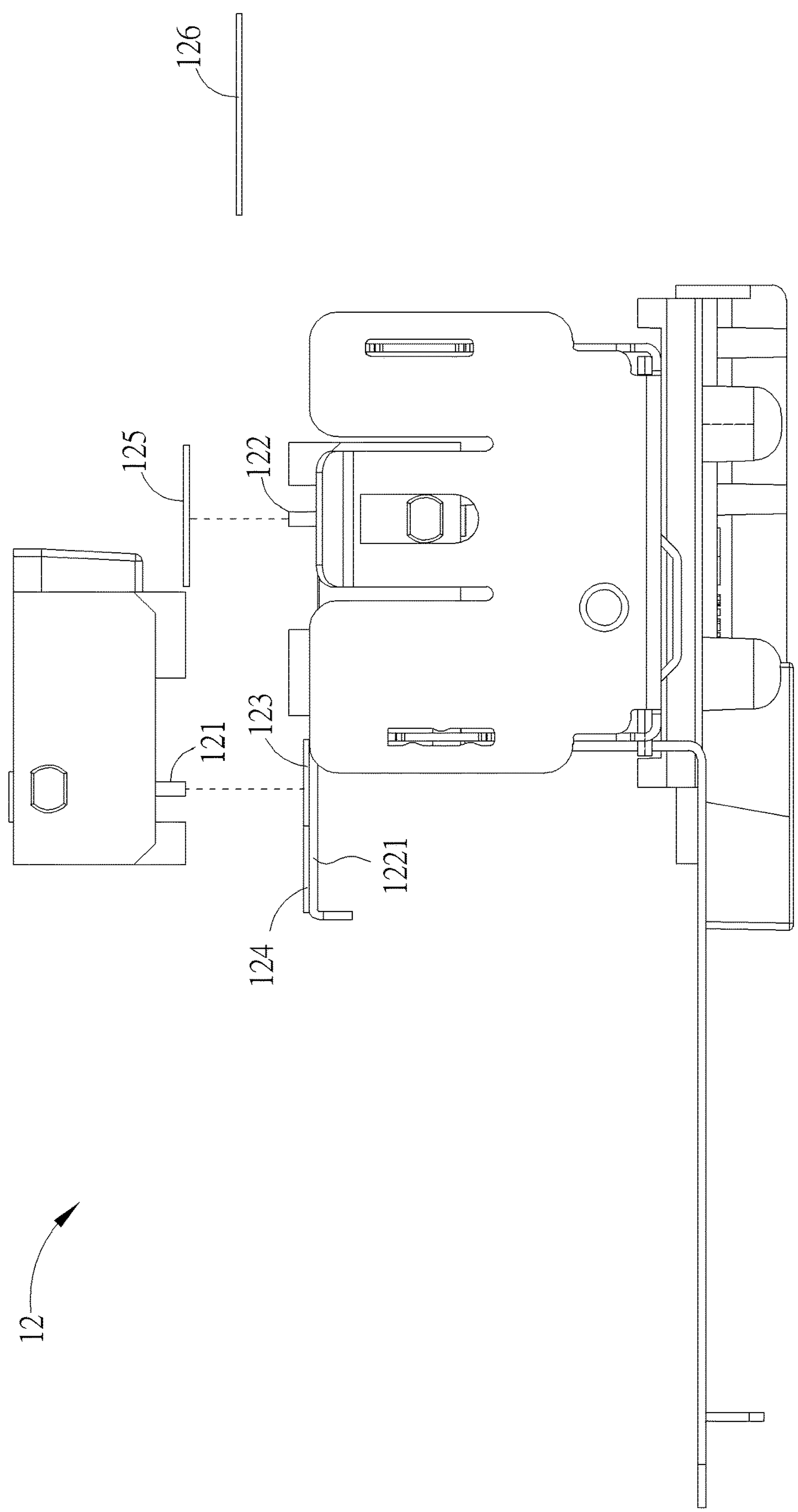

Please refer to FIG. 5 to FIG. 7. FIG. 5 to FIG. 7 are diagrams of the two-sided scanning device 12 in different states according to the first embodiment of the present disclosure. In order to illustrate an operational principle of the two-sided scanning device 12 of the present disclosure more specifically, FIG. 5 to FIG. 7 only illustrate the two-sided scanning device 12, and other components are omitted. When it is desired to operate the office machine 1 of the present disclosure to scan the object 2, the scanning brightness of the first image scanning module 121 and the scanning brightness of the second image scanning module 122 can be calibrated firstly, so as to ensure scanning quality. That is, during the aforementioned process, the second image scanning module 122 can move relative to the first image scanning module 121 to a first calibration position as shown in FIG. 5. When the second image scanning module 122 is located at the first calibration position relative to the first image scanning module 121, the second image scanning module 122 is aligned with the second brightness calibration component 126, so that the second image scanning module 122 can scan the second brightness calibration component 126, so as to calibrate the scanning brightness of the second image scanning module 122 according to the scanned image of the second brightness calibration component 126. Then, the second image scanning module 122 can move relative to the first image scanning module 121 to a second calibration position as shown in FIG. 6. When the second image scanning module 122 is located at the second calibration position relative to the first image scanning module 121, the first image scanning module 121 is aligned with the first brightness calibration component 124, so that the first image scanning module 121 can scan the first brightness calibration component 124, so as to calibrate the scanning brightness of the first image scanning module 121 according to the scanned image of the first brightness calibration component 124. From the above, in this embodiment, calibration of the scanning brightness of the first image scanning module 121 and the scanning brightness of the second image scanning module 122 is performed by two-stage operation.

Afterwards, the second image scanning module 122 can move relative to the first image scanning module 121 to a scanning position as shown in FIG. 7. When the second image scanning module 122 is located at the scanning position relative to the first image scanning module 121, the first image scanning module 121 and the second image scanning module 122 are aligned with the first scanning background component 123 and the second scanning background component 125. In such a way, when the feeder 11 drives the object 2 to pass through the scanning passage 10, the first scanning background component 123 and the second scanning background component 125 can be used as the first scanning background for the first image scanning module 121 and the second scanning background for the second image scanning module 122, respectively.

It should be noticed that, in a practical application, colors of edges of the first side 21 and the second side 22 of the object 2 and colors of the first brightness calibration component 124 and the second brightness calibration component 126 are usually white. In order to distinguish between a scanned image of the scanning background and a scanned image of the object 2, colors of the first scanning background component 123 and the second scanning background component 125 can be preferably different from the colors of the edges of the first side 21 and the second side 22 of the object 2 and the colors of the first brightness calibration component 124 and the second brightness calibration component 126. For example, the colors of the first scanning background component 123 and the second scanning background component 125 can be gray or black, so that there is a clear border formed between the scanned image of the scanning background and the scanned image of the object 2. Therefore, it is easy to distinguish between the scanned image of the object 2 and the image of the scanning background, which makes a recognized size of the scanned image of the object 2 to match with an actual size of the scanned image of the object 2.

Figure 8:
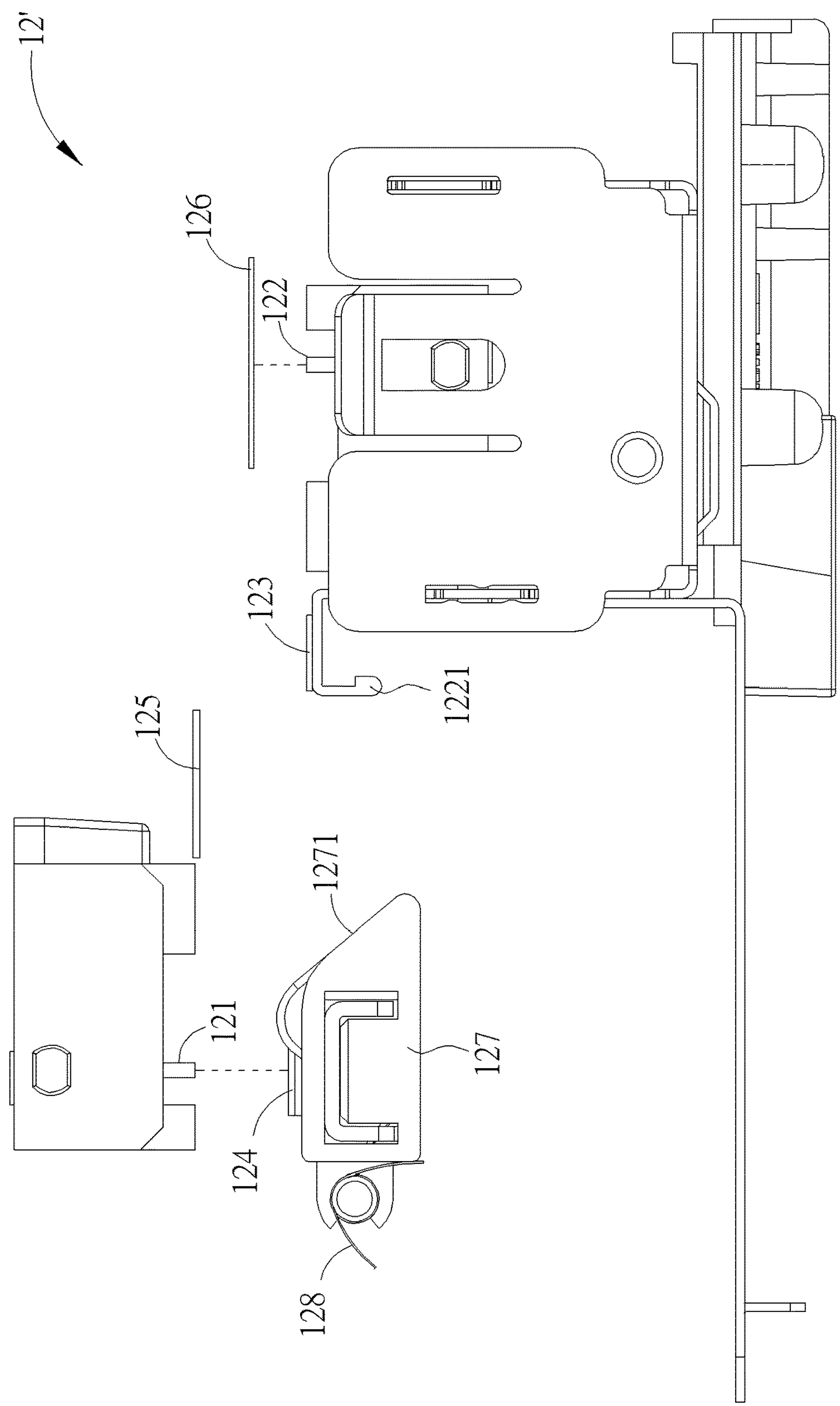
FIG. 8 and FIG. 9 are diagrams of a two-sided scanning device in different states according to a second embodiment of the present disclosure.
Figure 9:
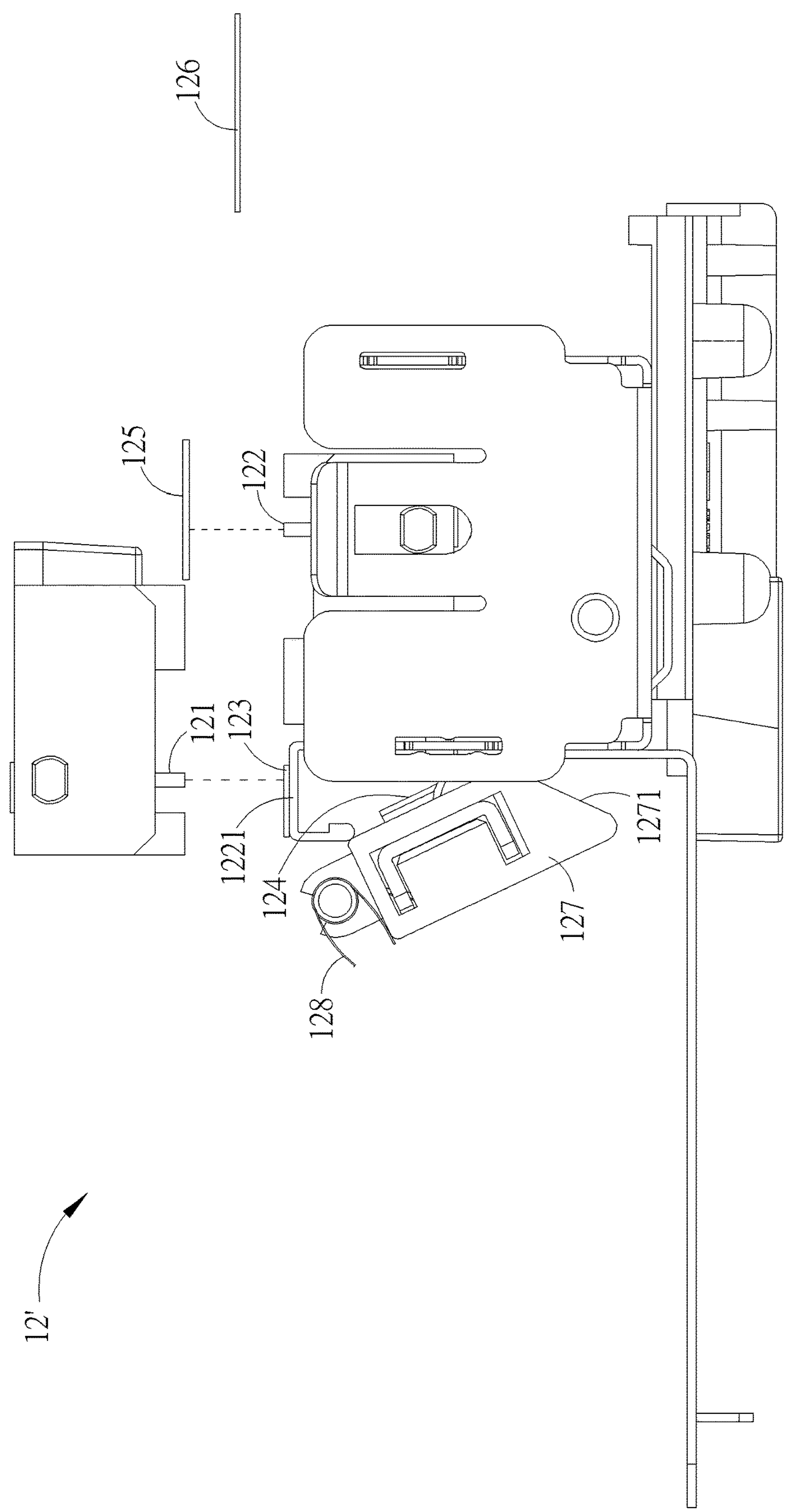

Please refer to FIG. 8 and FIG. 9. FIG. 8 and FIG. 9 are diagrams of a two-sided scanning device 12' in different states according to a second embodiment of the present disclosure. As shown in FIG. 8 and FIG. 9, different from the two-sided scanning device 12 of the first embodiment, the two-sided scanning device 12' of the second embodiment includes the first image scanning module 121, the second image scanning module 122, the first scanning background component 123, the first brightness calibration component 124, the second scanning background component 125, the second brightness calibration component 126, a pivoting component 127 and a recovering component 128. The structures and the configurations of the first image scanning module 121, the second image scanning module 122, the second scanning background component 125 and the second brightness calibration component 126 of this embodiment are similar to those of the first embodiment. Detailed description is omitted herein for simplicity. In this embodiment, the first brightness calibration component 124 is disposed on the pivoting component 127. The first scanning background component 123 is disposed on the disposing platform 1221 of the second image scanning module 122. Furthermore, the pivoting component 127 is pivotally disposed on a position opposite to the first image scanning module 121. For example, the pivoting component 127 can be pivoted to the main body 14 directly or indirectly by other mechanical components. The pivoting component 127 includes an inclined surface 1271. The pivoting component 127 can cooperate with the disposing platform 1221 of the second image scanning module 122 by the inclined surface 1271 to drive the first brightness calibration component 124 to rotate. The recovering component 128 can be a torsional spring. The recovering component 128 drives the pivoting component 127 to pivotally recover the first brightness calibration component 124 to be aligned with the first image scanning module 121 when the disposing platform 1221 of the second image scanning module 122 does not contact against the inclined surface 1271. Ina brightness calibration stage, the second image scanning module 122 can move relative to the first image scanning module 121 to a calibration position as shown in FIG. 8. At this moment, the first image scanning module 121 and the second image scanning module 122 are aligned with the first brightness calibration component 124 and the second brightness calibration component 126 respectively, so as to respectively calibrate the scanning brightness of the first image scanning module 121 and the second image scanning module 122 according to the scanned image of the first brightness calibration component 124 and the scanned image of the second brightness calibration component 126. From the above, in this embodiment, the calibration of the scanning brightness of the first image scanning module 121 and the scanning brightness of the second image scanning module 122 is performed by one-stage operation.

Afterwards, when the second image scanning module 122 moves relative to the first image scanning module 121 to a scanning position as shown in FIG. 9, the disposing platform 1221 of the second image scanning module 122 can push the inclined surface 1271 to drive the pivoting component 127 to rotate the first brightness calibration component 124. During the aforementioned process, the inclined surface 1271 and the disposing platform 1221 slide relative to each other to drive the pivoting component 127 to pivot, so as to allow the second image scanning module 122 to move to the scanning position relative to the first image scanning module 121, so that the first image scanning module 121 and the second image scanning module 122 are aligned with the first scanning background component 123 and the second scanning background component 125 respectively. In such a way, the first scanning background component 123 and the second scanning background component 125 can be the first scanning background for the first image scanning module 121 and the second scanning background for the second image scanning module 122, respectively.

Figure 10:
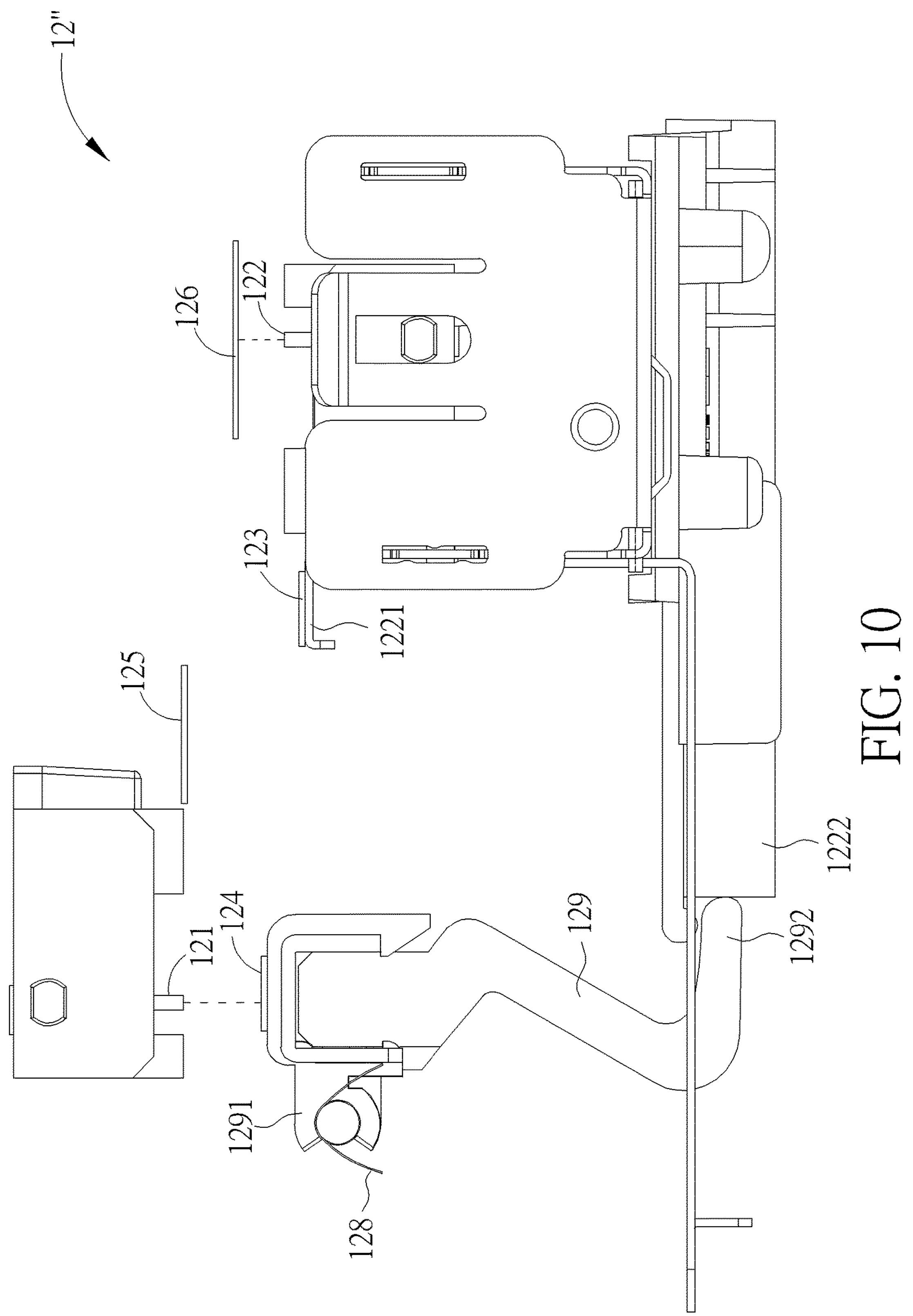
FIG. 10 and FIG. 11 are diagrams of a two-sided scanning device in different states according to a third embodiment of the present disclosure.
Figure 11:
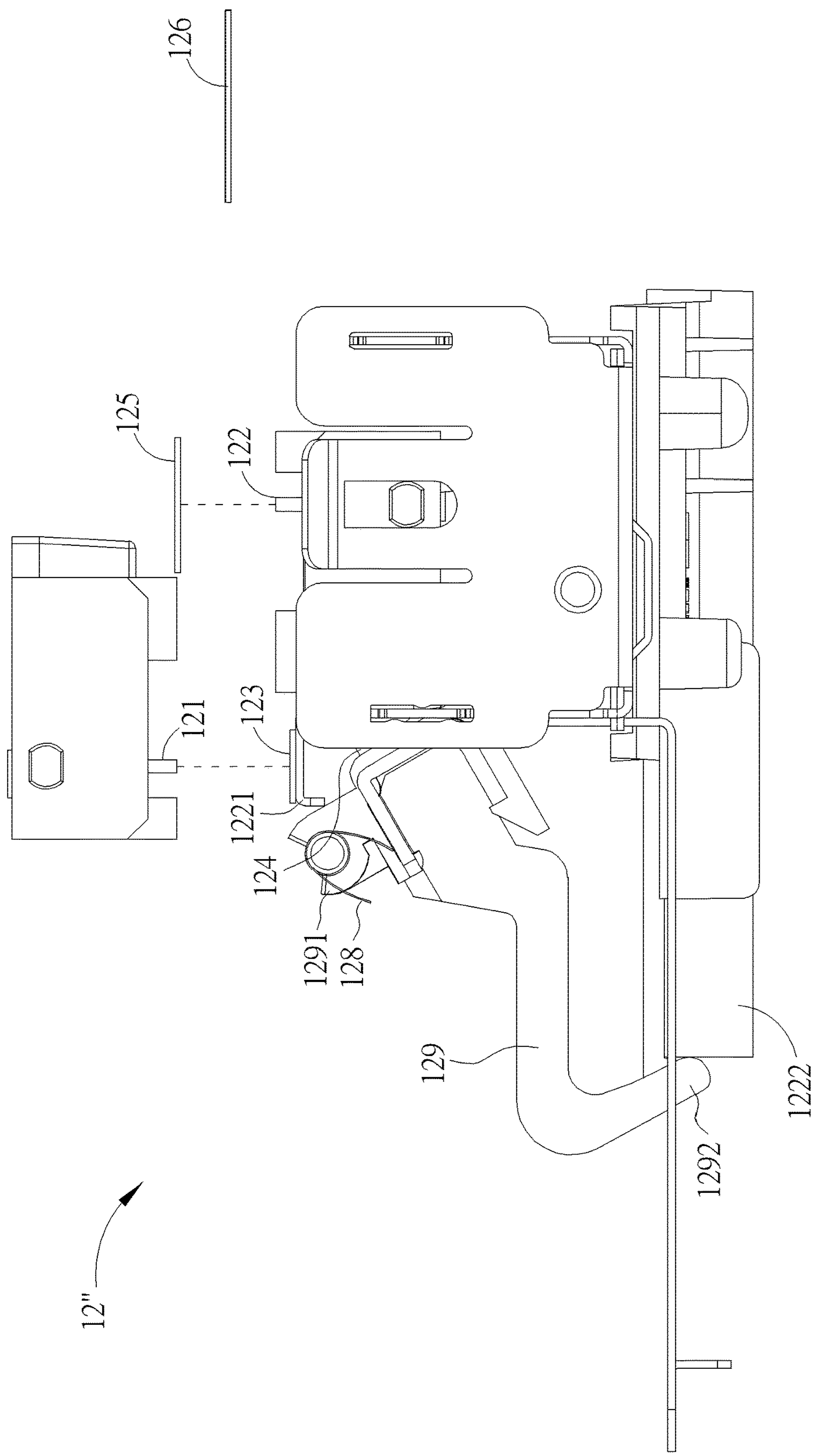

Furthermore, please refer to FIG. 10 and FIG. 11. FIG. 10 and FIG. 11 are diagrams of a two-sided scanning device 12" in different states according to a third embodiment of the present disclosure. As shown in FIG. 10 and FIG. 11, different from the two-sided scanning devices 12, 12' of the aforementioned embodiments, the two-sided scanning device 12" includes the first image scanning module 121, the second image scanning module 122, the first scanning background component 123, the first brightness calibration component 124, the second scanning background component 125, the second brightness calibration component 126, the recovering component 128 and a rotary component 129. The structures and the configurations of the first image scanning module 121, the second image scanning module 122, the second scanning background component 125 and the second brightness calibration component 126 of this embodiment are similar to those of the aforementioned embodiment. Detailed description is omitted herein for simplicity. In this embodiment, a first end 1291 of the rotary component 129 is pivotally disposed on the position opposite to the first image scanning module 121. For example, the rotary component 129 is pivotally disposed on the main body 14, which is not shown in FIG. 10 and FIG. 11, directly or indirectly by other mechanical components. A second end 1292 of the rotary component 129 opposite to the first end 1291 of the rotary component 129 is for cooperating with a base 1222 of the second image scanning module 122. The first brightness calibration component 124 is disposed on the rotary component 129 and located at the position opposite to the first image scanning module 121, i.e., the first brightness calibration component 124 is adjacent to the first end 1291 of the rotary component 129. The first scanning background component 123 is disposed on the disposing platform 1221 of the second image scanning module 122. The recovering component 128 is for driving the rotary component 129 to pivotally recover the first brightness calibration component 124 when the second image scanning module 122 does not contact against the second end 1292 of the rotary component 129. In this embodiment, the recovering component 128 can be disposed on a pivoting shaft of the rotary component 129. When the second image scanning module 122 moves relative to the first image scanning module 121 to a calibration position as shown in FIG. 10, the first image scanning module 121 and the second image scanning module 122 are aligned with the first brightness calibration component 124 and the second brightness calibration component 126, so as to respectively calibrate the scanning brightness of the first image scanning module 121 and the second image scanning module 122 according to the scanned image of the first brightness calibration component 124 and the scanned image of the second brightness calibration component 126. From the above, the calibration of the scanning brightness of the first image scanning module 121 and the scanning brightness of the second image scanning module 122 is performed by one-stage operation.

Afterwards, when the second image scanning module 122 moves relative to the first image scanning module 121 to a scanning position as shown in FIG. 11, the second image scanning module 122 can push the second end 1292 of the rotary component 129 by the base 1222 to drive the first brightness calibration component 124 to pivot, so as to allow the second image scanning module 122 to move to the scanning position relative to the first image scanning module 121, so that the first image scanning module 121 and the second image scanning module 122 are aligned with the first scanning background component 123 and the second scanning background component 125, respectively. In such a way, the first scanning background component 123 and the second scanning background component 125 can be the first scanning background for the first image scanning module 121 and the second scanning background for the second image scanning module 122, respectively.

In contrast to the prior art, the present disclosure utilizes the second image scanning module for selectively driving the first brightness calibration component or the first scanning background component to be aligned with the first image scanning module when the second image scanning module moves relative to the first image scanning module. In such a way, the first image scanning module and the second image scanning module are aligned with the first brightness calibration component and the second brightness calibration component respectively when it is desired to calibrate the scanning brightness of the first image scanning module and the scanning brightness of the second image scanning module. Besides, the first image scanning module and the second image scanning module are aligned with the first scanning background component and the second scanning background component respectively when it is desired to scan the first side and the second side of the object opposite to each other, so that the first scanning background component and the second scanning background component can be used as the first scanning background for the first image scanning module and the second scanning background for the second image scanning module, respectively. Therefore, it facilitates the two-sided scanning device of the present disclosure to distinguish between scanned images of the object and scanned images of the scanning backgrounds, which makes a recognized size of the scanned images of the object match with an actual size of the scanned images of the object.

Those skilled in the art will readily observe that numerous modifications and alterations of the device and method may be made while retaining the teachings of the disclosure.

Accordingly, the above disclosure should be construed as limited only by the metes and bounds of the appended claims.

What is claimed is:

1. A two-sided scanning device comprising:

a first image scanning module for scanning a first side of an object;

a second image scanning module disposed opposite to the first image scanning module and for scanning a second side of the object opposite to the first side of the object;

a first scanning background component used as a first scanning background for the first image scanning module;

a first brightness calibration component for calibrating a scanning brightness of the first image scanning module;

a second scanning background component used as a second scanning background for the first image scanning module; and a second brightness calibration component for calibrating a scanning brightness of the second image scanning module;

wherein the second image scanning module moves relative to the first image scanning module to align the second image scanning module with the second brightness calibration component or the second scanning background component selectively and further to align the first image scanning module with the first brightness calibration component or the first scanning background component selectively, and the first image scanning module and the second image scanning module are aligned with the first scanning background component and the second scanning background component respectively when the second image scanning module moves to a scanning position relative to the first image scanning module.

2. The two-sided scanning device of claim 1, wherein the first scanning background component is disposed on the second image scanning module.

3. The two-sided scanning device of claim 2, wherein the first brightness calibration component is disposed on the second image scanning module and adjacent to the first scanning background component.

4. The two-sided scanning device of claim 2, wherein the second image scanning module is aligned with the second brightness calibration component when the second image scanning module moves to a first calibration position relative to the first image scanning module, the second image scanning module drives the first brightness calibration component and the first scanning background component to move to align the first image scanning module with the first brightness calibration component when the second image scanning module moves to a second calibration position relative to the first image scanning module, and the second image scanning module drives the first brightness calibration component and the first scanning background component to move to align the first image scanning module and the second image scanning module with the first scanning background component and the second scanning background component respectively when the second image scanning module moves to the scanning position relative to the first image scanning module.

5. The two-sided scanning device of claim 2, wherein the first brightness calibration component is separated from the second image scanning module and pivotally disposed on a position opposite to the first image scanning module.

6. The two-sided scanning device of claim 5, further comprising a pivoting component pivotally disposed on the position opposite to the first image scanning module, the first brightness calibration component being disposed on the pivoting component, the pivoting component comprising a inclined surface, and the second image scanning module pushing the inclined surface to drive the first brightness calibration component to pivot relative to the first image scanning module when the second image scanning module moves relative to the first image scanning module.

7. The two-sided scanning device of claim 5, wherein the first image scanning module and the second image scanning module are aligned with the first brightness calibration component and the second brightness calibration component respectively when the second image scanning module moves to a calibration position relative to the first image scanning module, and the second image scanning module drives the first brightness calibration component to pivot to align the first image scanning module and the second image scanning module with the first scanning background component and the second scanning background component respectively when the second image scanning module moves to the scanning position relative to the first image scanning module.

8. The two-sided scanning device of claim 6, further comprising a recovering component for driving the pivoting component to recover the first brightness calibration component pivotally when the second image scanning module does not contact against the inclined surface.

9. The two-sided scanning device of claim 2, further comprising a rotary component, a first end of the rotary component being pivotally disposed on a position opposite to the first image scanning module, the first brightness calibration component being disposed on the rotary component and disposed on the position opposite to the first image scanning module, and a second end of the rotary component opposite to the first end of the rotary component being for cooperating with the second image scanning module.

10. The two-sided scanning device of claim 9, further comprising a recovering component for driving the rotary component to recover the first brightness calibration component pivotally when the second image scanning module does not contact against the second end of the rotary component.

11. The two-sided scanning device of claim 9, wherein the first image scanning module and the second image scanning module are aligned with the first brightness calibration component and the second brightness calibration component respectively when the second image scanning module moves to a calibration position relative to the first image scanning module, and the second image scanning module pushes the second end of the rotary component to drive the first brightness calibration component to pivot to align the first image scanning module and the second image scanning module with the first scanning background component and the second scanning background component respectively when the second image scanning module moves to the scanning position relative to the first image scanning module.

12. The two-sided scanning device of claim 1, wherein a color of the first scanning background component is different from a color of a periphery of the first side of the object, and a color of the second scanning background component is different from a color of a periphery of the second side of the object.

13. An office machine comprising:

a scanning passage for allowing an object to pass therethrough;

a feeder for driving the object to pass through the scanning passage; and a two-sided scanning device for scanning a first side and a second side of the object entering into the scanning passage, the first side being opposite to the second side, and the two-sided scanning device comprising:

a first image scanning module for scanning the first side of the object;

a second image scanning module disposed opposite to the first image scanning module and for scanning the second side of the object;

a first scanning background component used as a first scanning background for the first image scanning module;

a first brightness calibration component for calibrating a scanning brightness of the first image scanning module;

a second scanning background component used as a second scanning background for the first image scanning module; and a second brightness calibration component for calibrating a scanning brightness of the second image scanning module;

wherein the second image scanning module moves relative to the first image scanning module to align the second image scanning module with the second brightness calibration component or the second scanning background component selectively and further to align the first image scanning module with the first brightness calibration component or the first scanning background component selectively, and the first image scanning module and the second image scanning module are aligned with the first scanning background component and the second scanning background component respectively when the second image scanning module moves to a scanning position relative to the first image scanning module.

14. The office apparatus of claim 13, wherein the first scanning background component is disposed on the second image scanning module.

15. The office machine of claim 14, wherein the first brightness calibration component is disposed on the second image scanning module and adjacent to the first scanning background component.

16. The office machine of claim 14, wherein the second image scanning module is aligned with the second brightness calibration component when the second image scanning module moves to a first calibration position relative to the first image scanning module, the second image scanning module drives the first brightness calibration component and the first scanning background component to move to align the first image scanning module with the first brightness calibration component when the second image scanning module moves to a second calibration position relative to the first image scanning module, and the second image scanning module drives the first brightness calibration component and the first scanning background component to move to align the first image scanning module and the second image scanning module with the first scanning background component and the second scanning background component respectively when the second image scanning module moves to the scanning position relative to the first image scanning module.

17. The office machine of claim 14, wherein the first brightness calibration component is separated from the second image scanning module and pivotally disposed on a position opposite to the first image scanning module.

18. The office machine of claim 17, wherein the two-sided scanning device further comprises a pivoting component pivotally disposed on the position opposite to the first image scanning module, the first brightness calibration component is disposed on the pivoting component, the pivoting component comprises a inclined surface, and the second image scanning module pushes the inclined surface to drive the first brightness calibration component to pivot relative to the first image scanning module when the second image scanning module moves relative to the first image scanning module.

19. The office machine of claim 17, wherein the first image scanning module and the second image scanning module are aligned with the first brightness calibration component and the second brightness calibration component respectively when the second image scanning module moves to a calibration position relative to the first image scanning module, and the second image scanning module drives the first brightness calibration component to pivot to align the first image scanning module and the second image scanning module with the first scanning background component and the second scanning background component respectively when the second image scanning module moves to the scanning position relative to the first image scanning module.

20. The office machine of claim 14, wherein the two-sided scanning device further comprises a rotary component, a first end of the rotary component is pivotally disposed on a position opposite to the first image scanning module, the first brightness calibration component is disposed on the rotary component and disposed on the position opposite to the first image scanning module, and a second end of the rotary component opposite to the first end of the rotary component is for cooperating with the second image scanning module.

* * * * *